US009830909B2

(12) United States Patent
Parkinson

(10) Patent No.: US 9,830,909 B2
(45) Date of Patent: *Nov. 28, 2017

(54) USER CONFIGURABLE SPEECH COMMANDS

(71) Applicant: Kopin Corporation, Westborough, MA (US)

(72) Inventor: Christopher Parkinson, Richland, WA (US)

(73) Assignee: Kopin Corporation, Westborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/475,803

(22) Filed: Mar. 31, 2017

(65) Prior Publication Data

US 2017/0206902 A1    Jul. 20, 2017

Related U.S. Application Data

(63) Continuation of application No. 14/573,526, filed on Dec. 17, 2014, now Pat. No. 9,640,178.

(Continued)

(51) Int. Cl.
  *G10L 15/00* (2013.01)
  *G10L 15/22* (2006.01)
  *G06F 3/16* (2006.01)

(52) U.S. Cl.
  CPC .............. *G10L 15/22* (2013.01); *G06F 3/167* (2013.01); *G10L 2015/223* (2013.01)

(58) Field of Classification Search
  CPC ... G06F 3/167; G06F 3/011; G02B 2027/014; G02B 27/0101; G02B 27/017

(Continued)

(56) References Cited

U.S. PATENT DOCUMENTS 5,867,817 A * 2/1999 Catallo ................... G10L 15/26
                                                                   704/255
8,736,516 B2 * 5/2014 Jacobsen ................ G06F 3/011
                                                                   345/156

(Continued)

FOREIGN PATENT DOCUMENTS

WO    WO 2015100107    7/2015

OTHER PUBLICATIONS

International Search Report and Written Opinion of PCT/US2014/070900 dated Mar. 27, 2015 entitled "User Configurable Speech Commands".

(Continued)

*Primary Examiner* — Charlotte M Baker
(74) *Attorney, Agent, or Firm* — hamilton, Brook, Smith & Reynolds, P.C.

(57) ABSTRACT

A speech recognition method and system enables user-configurable speech commands. For a given speech command, the speech recognition engine provides a mechanism for the end-user to select speech command terms to use in substitution for the given speech command. The speech recognition engine, or module thereof, forms a replacement command for the given speech command from the user-selected speech command terms. The speech recognition engine thereafter is synonymously responsive to user utterance of the replacement command as though the user issued/voiced the associated counterpart given speech command.

20 Claims, 5 Drawing Sheets

Related U.S. Application Data

(60) Provisional application No. 61/920,926, filed on Dec. 26, 2013.

(58) Field of Classification Search
USPC .......................................................... 704/251
See application file for complete search history.

(56) References Cited

U.S. PATENT DOCUMENTS

| | | |
|---|---|---|
| 9,640,178 B2 | 5/2017 | Parkinson |
| 2012/0265536 A1 | 10/2012 | Paik et al. |
| 2013/0231937 A1 | 9/2013 | Woodall et al. |
| 2016/0097930 A1* | 4/2016 | Robbins ............. G02B 27/0172 345/8 |

OTHER PUBLICATIONS

International Preliminary Report on Patentability for PCT/US2014/070900 dated Jul. 7, 2016 entitled "User Configurable Speech Commands".

* cited by examiner

USER CONFIGURABLE SPEECH COMMANDS

RELATED APPLICATION(S)

This application is a continuation of U.S. application Ser. No. 14/573,526, filed on Dec. 17, 2014 which claims the benefit of U.S. Provisional Application No. 61/920,926, filed on Dec. 26, 2013. The entire teachings of these applications are incorporated herein by reference.

BACKGROUND OF THE INVENTION

Mobile computing devices, such as a laptop or notebook PC, a smart phone, and tablet computing device, are now common tools used for producing, analyzing, communicating, and consuming data in both business and personal life. Consumers continue to embrace a mobile digital lifestyle as the ease of access to digital information increases with high speed wireless communications technologies becoming ubiquitous. Popular uses of mobile computing devices include displaying large amounts of high-resolution computer graphics information and video content, often wirelessly streamed to the device. While these devices typically include a display screen, the preferred visual experience of a high resolution, large format display cannot be easily replicated in such mobile devices because the physical size of such device is limited to promote mobility. Another drawback of the aforementioned device types is that the user interface is hands-dependent, typically requiring a user to enter data or make selections using a keyboard (physical or virtual) or touch-screen display. As a result, consumers are now seeking a hands-free, high quality, portable, color display solution to augment or replace their hands-dependent mobile devices.

SUMMARY OF THE INVENTION

Recently developed micro-displays can provide large-format, high-resolution color pictures and streaming video in a very small form factor. One application for such displays can be integrated into a wireless headset computer worn on the head of the user with a display within the field of view of the user, similar in format to eyeglasses, audio headset or video eyewear.

A "wireless computing headset" device, also referred to herein as a headset computer (HSC) or head mounted display (HMD), includes one or more small, high resolution micro-displays and associated optics to magnify the image. The high resolution micro-displays can provide super video graphics array (SVGA) (800×600) resolution or extended graphic arrays (XGA) (1024×768) resolution, or higher resolutions known in the art.

A wireless computing headset contains one or more wireless computing and communication interfaces, enabling data and streaming video capability, and provides greater convenience and mobility through hands dependent devices.

For more information concerning such devices, see co-pending patent applications entitled "Mobile Wireless Display Software Platform for Controlling Other Systems and Devices," U.S. application Ser. No. 12/348,648 filed Jan. 5, 2009, "Handheld Wireless Display Devices Having High Resolution Display Suitable For Use as a Mobile Internet Device," PCT International Application No. PCT/US09/38601 filed Mar. 27, 2009, and "Improved Headset Computer," U.S. application Ser. No. 61/638,419 filed Apr. 25, 2012, each of which are incorporated herein by reference in their entirety.

As used herein "HSC" headset computers, "HMD" head mounted display device, and "wireless computing headset" device may be used interchangeably.

In one aspect, the invention is a headset computer that includes a microdisplay coupled to a processor, a microphone coupled to the processor, and a speech recognition engine. The speech recognition engine is responsive to user utterances into the microphone. The speech recognition engine configured to cause an action to be performed upon recognition of a preset speech command, and to support user-configurable speech commands.

In one embodiment, the speech recognition engine is further configured to present the preset speech command, and an associated field, to the headset computer user. The associated field is presented to the user to allow the user to enter a substitute speech command. The substitute speech command may be interpreted to cause the same action as is performed when the preset speech command is recognized. The speech recognition engine may perform the action when either the preset speech command or the substitute speech command is recognized, or it may perform the action only when one or the other of the preset speech command or the substitute speech command is recognized. The particular action may be selectable by user input.

In another embodiment, the speech recognition engine, upon recognizing the substitute speech command, causes a first action to be performed. The first action corresponds to the preset speech command. In another embodiment, the first action is performed only when the speech recognition engine recognizes the substitute speech command. In one embodiment, the first action is performed when either the speech recognition engine recognizes the substitute speech command or when the speech recognition engine recognizes the preset speech command.

In another embodiment, the substitute speech command entered in the associated field is valid for a predetermined time interval, after which only the preset speech command is valid. In another embodiment, the substitute speech command entered in the associated field is valid only for the user who submitted the substitute command.

One embodiment further includes a speech command configuration module, operatively coupled to the speech recognition engine. The speech command configuration module may enable an end user to select speech command terms to use in substitution for a given speech command. The user-selected speech command terms may form a substitute command for the given speech command.

Another embodiment further includes a speech command configuration module configured to receive a substitute speech command from the user, where the substitute command corresponds to the preset speech command. The speech command configuration module is further configured to associate the substitute speech command with the action to be performed upon recognition of a preset speech command. The speech command configuration module configured to perform the action upon recognition of the substitute speech command. In one embodiment, the speech command configuration module is further configured to perform the action upon recognition of the preset speech command.

In another aspect, the invention is a speech recognition method that includes recognizing a user utterance, causing an action to be performed upon recognition of the utterance as a preset speech command, and supporting user-configurable speech commands.

One embodiment further includes presenting the preset speech command and an associated field to the headset computer user, and receiving a substitute speech command entered into the associated field.

Another embodiment further includes, upon recognizing the substitute speech command, causing a first action to be performed. The first action corresponds to the preset speech command. Another embodiment further includes performing the first action only when the speech recognition engine recognizes the substitute speech command. Yet another embodiment further includes performing the first action when either the speech recognition engine recognizes the substitute speech command, or when the speech recognition engine recognizes the preset speech command.

In one embodiment, the substitute speech command entered in the associated field is valid for a predetermined time interval, after which only the preset speech command is valid.

In another embodiment, the substitute speech command entered in the associated field is valid only for the user who submitted the substitute command.

In another aspect, the invention is a non-transitory computer-readable medium for recognizing speech. The non-transitory computer-readable medium comprises computer software instructions stored thereon. The computer software instructions, when executed by at least one processor, cause a computer system to recognizing a user utterance. The computer software instructions further cause an action to be performed upon recognition of the utterance as a preset speech command. The computer software instructions further cause the support of user-configurable speech commands.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The teachings of all patents, published applications and references cited herein are incorporated by reference in their entirety.

Figure 1A:
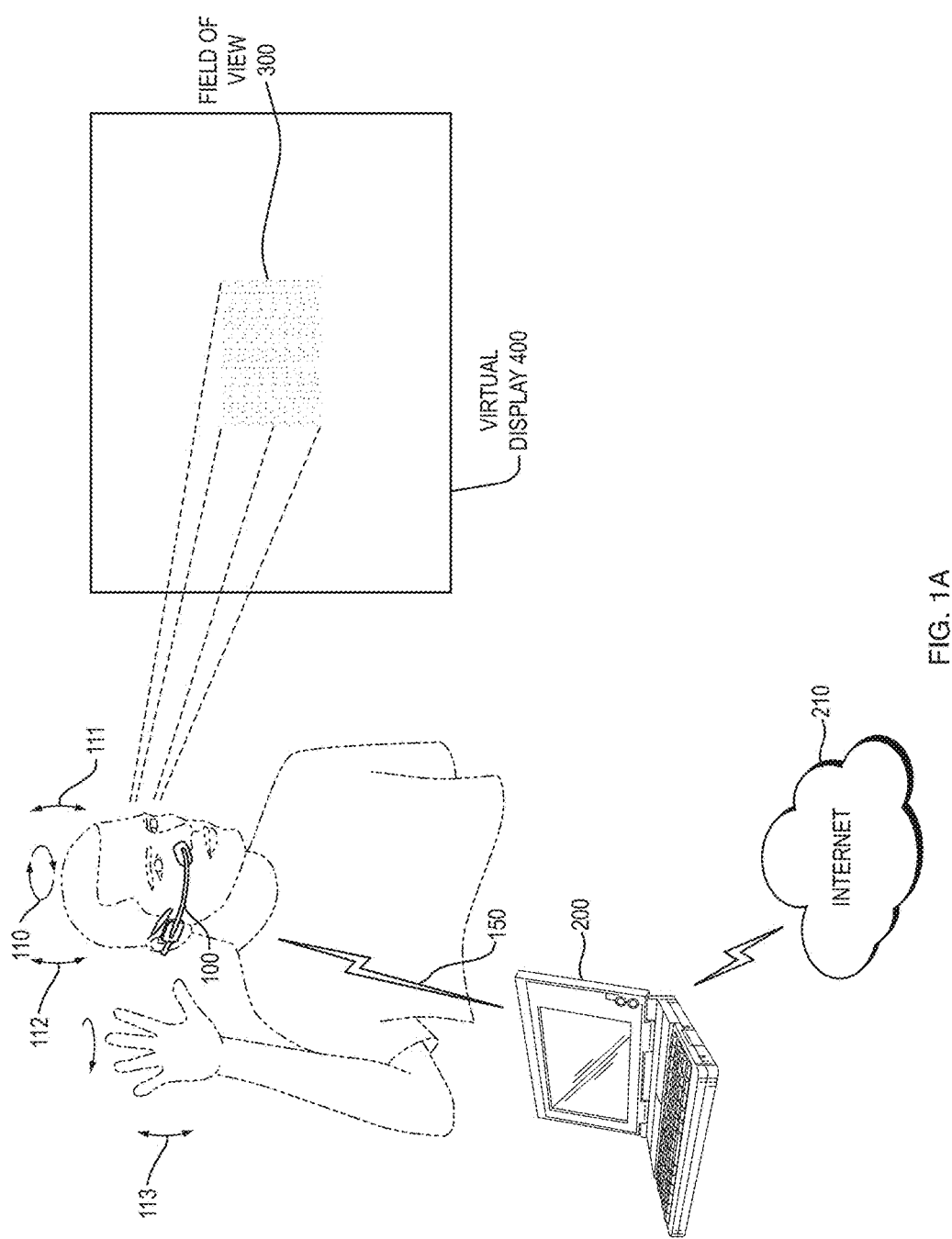
FIGS. 1A-1B are schematic illustrations of a headset computer cooperating with a host computer (e.g., Smart Phone, laptop, etc.) according to principles of the present invention.
Figure 1B:
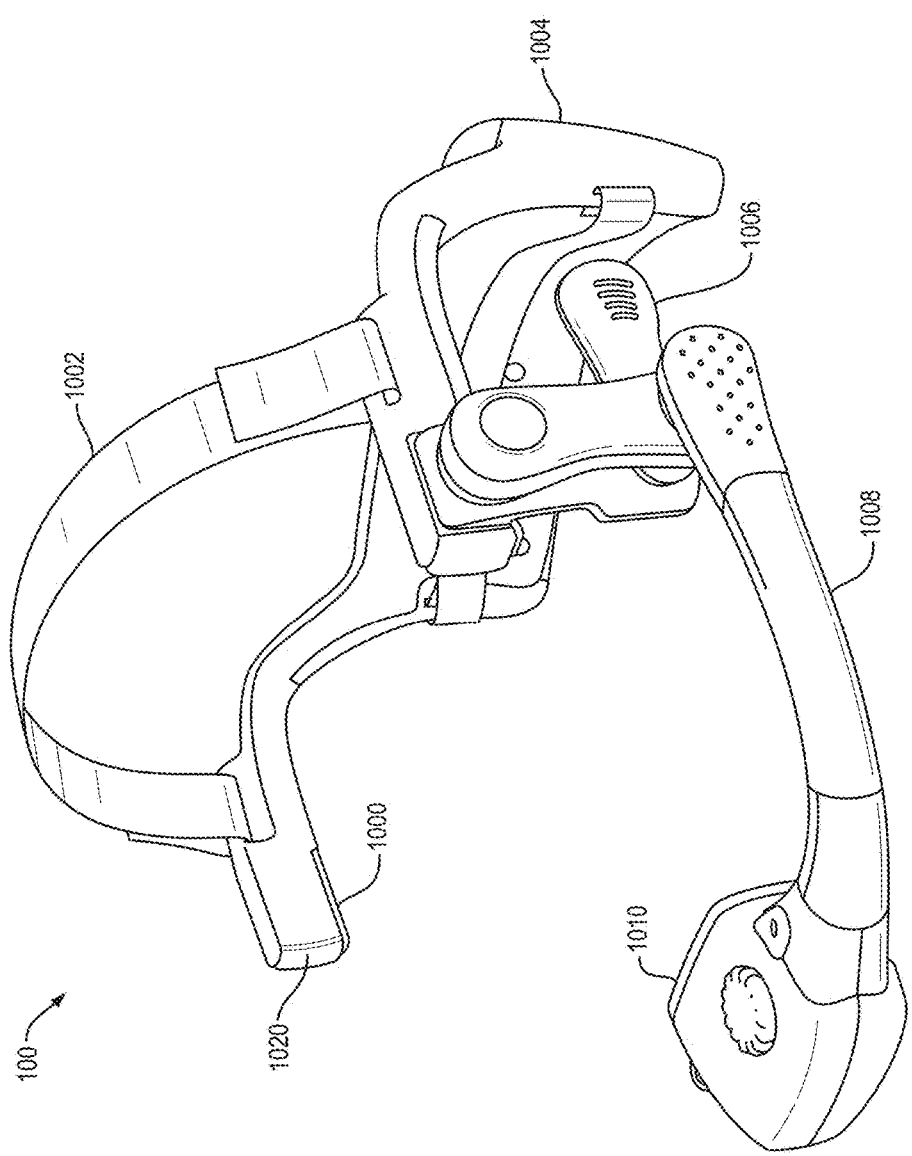

FIGS. 1A and 1B show an example embodiment of a wireless computing headset device 100 (also referred to herein as a headset computer (HSC) or head mounted display (HMD)) that incorporates a high-resolution (VGA or better) micro-display element 1010, and other features described below.

HSC 100 can include audio input and/or output devices, including one or more microphones, input and output speakers, geo-positional sensors (GPS), three to nine axis degrees of freedom orientation sensors, atmospheric sensors, health condition sensors, digital compass, pressure sensors, environmental sensors, energy sensors, acceleration sensors, position, attitude, motion, velocity and/or optical sensors, cameras (visible light, infrared, etc.), multiple wireless radios, auxiliary lighting, rangefinders, or the like and/or an array of sensors embedded and/or integrated into the headset and/or attached to the device via one or more peripheral ports 1020 (FIG. 1B).

Typically located within the housing of headset computing device 100 are various electronic circuits including, a microcomputer (single or multicore processors), one or more wired and/or wireless communications interfaces, memory or storage devices, various sensors and a peripheral mount or mount, such as a "hot shoe."

Example embodiments of the HSC 100 can receive user input through sensing voice commands, head movements, 110, 111, 112 and hand gestures 113, or any combination thereof. A microphone (or microphones) operatively coupled to or integrated into the HSC 100 can be used to capture speech commands, which are then digitized and processed using automatic speech recognition techniques. Gyroscopes, accelerometers, and other micro-electromechanical system sensors can be integrated into the HSC 100 and used to track the user's head movements 110, 111, 112 to provide user input commands. Cameras or motion tracking sensors can be used to monitor a user's hand gestures 113 for user input commands. Such a user interface may overcome the disadvantages of hands-dependent formats inherent in other mobile devices.

The HSC 100 can be used in various ways. It can be used as a peripheral display for displaying video signals received and processed by a remote host computing device 200 (shown in FIG. 1A). The host 200 may be, for example, a notebook PC, smart phone, tablet device, or other computing device having less or greater computational complexity than the wireless computing headset device 100, such as cloud-based network resources. The headset computing device 100 and host 200 can wirelessly communicate via one or more wireless protocols, such as Bluetooth®, Wi-Fi, WiMAX, 4G LTE or other wireless radio link 150. (Bluetooth is a registered trademark of Bluetooth Sig, Inc. of 5209 Lake Washington Boulevard, Kirkland, Wash. 98033).

In an example embodiment, the host 200 may be further connected to other networks, such as through a wireless connection to the Internet or other cloud-based network resources, so that the host 200 can act as a wireless relay between the HSC 100 and the network 210. Alternatively, some embodiments of the HSC 100 can establish a wireless connection to the Internet (or other cloud-based network resources) directly, without the use of a host wireless relay. In such embodiments, components of the HSC 100 and the host 200 may be combined into a single device.

FIG. 1B is a perspective view showing some details of an example embodiment of a headset computer 100. The example embodiment HSC 100 generally includes, a frame 1000, strap 1002, rear housing 1004, speaker 1006, cantilever, or alternatively referred to as an arm or boom 1008 with a built in microphone, and a micro-display subassembly 1010.

A head worn frame 1000 and strap 1002 are generally configured so that a user can wear the headset computer device 100 on the user's head. A housing 1004 is generally a low profile unit which houses the electronics, such as the microprocessor, memory or other storage device, along with other associated circuitry. Speakers 1006 provide audio output to the user so that the user can hear information. Micro-display subassembly 1010 is used to render visual information to the user. It is coupled to the arm 1008. The arm 1008 generally provides physical support such that the micro-display subassembly is able to be positioned within the user's field of view 300 (FIG. 1A), preferably in front of the eye of the user or within its peripheral vision preferably slightly below or above the eye. Arm 1008 also provides the electrical or optical connections between the micro-display subassembly 1010 and the control circuitry housed within housing unit 1004.

According to aspects that will be explained in more detail below, the HSC display device 100 allows a user to select a field of view 300 within a much larger area defined by a virtual display 400. The user can typically control the position, extent (e.g., X-Y or 3D range), and/or magnification of the field of view 300.

While what is shown in FIGS. 1A and 1B is a monocular micro-display presenting a single fixed display element supported on the face of the user with a cantilevered boom, it should be understood that other mechanical configurations for the remote control display device 100 are possible, such as a binocular display with two separate micro-displays (e.g., one for each eye) or a single micro-display arranged to be viewable by both eyes.

Figure 2:
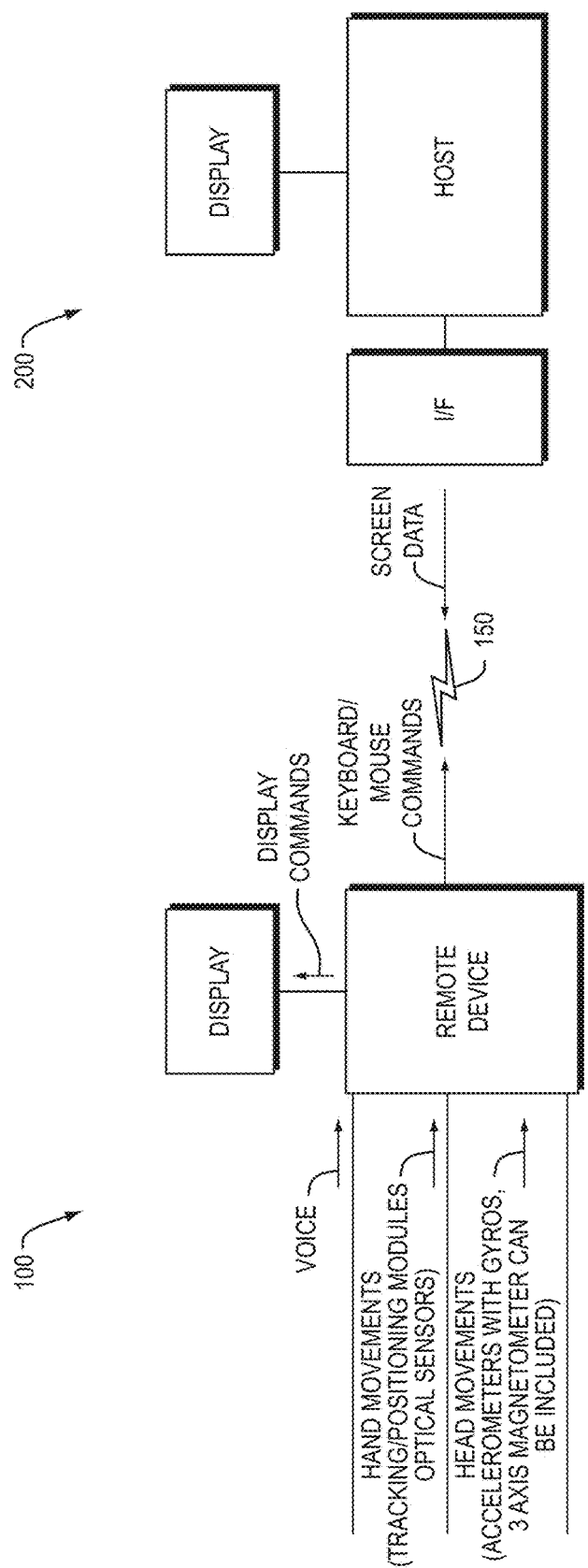
FIG. 2 is a block diagram of flow of data and control in the embodiment of FIGS. 1A-1B.

FIG. 2 is a block diagram showing more detail of an embodiment of the HSC or HMD device 100, host 200 and the data that travels between them. The HSC or HMD device 100 receives vocal input from the user via the microphone, hand movements or body gestures via positional and orientation sensors, the camera or optical sensor(s), and head movement inputs via the head tracking circuitry such as 3 axis to 9 axis degrees of freedom orientational sensing. These are translated by software (processors) in the HSC or HMD device 100 into keyboard and/or mouse commands that are then sent over the Bluetooth or other wireless interface 150 to the host 200. The host 200 then interprets these translated commands in accordance with its own operating system/application software to perform various functions. Among the commands is one to select a field of view 300 within the virtual display 400 and return that selected screen data to the HSC or HMD device 100. Thus, it should be understood that a very large format virtual display area might be associated with application software or an operating system running on the host 200. However, only a portion of that large virtual display area 400 within the field of view 300 is returned to and actually displayed by the micro display 1010 of HSC or HMD device 100.

In one embodiment, the HSC 100 may take the form of the device described in a co-pending U.S. Patent Publication Number 2011/0187640, which is hereby incorporated by reference in its entirety.

In another embodiment, the invention relates to the concept of using a Head Mounted Display (HMD) 1010 in conjunction with an external 'smart' device 200 (such as a smartphone or tablet) to provide information and control to the user hands-free. The invention requires transmission of small amounts of data, providing a more reliable data transfer method running in real-time.

In this sense therefore, the amount of data to be transmitted over the connection 150 is small-simply instructions on how to lay out a screen, which text to display, and other stylistic information such as drawing arrows, or the background colors, images to include, etc.

Additional data could be streamed over the same 150 or another connection and displayed on screen 1010, such as a video stream if required by the host 200.

Speech Recognition (ASR) systems are used to control devices. For the most part, ASR systems work well and allow a user to navigate and control a system with a high degree of accuracy.

Much time and effort is spent by system designers in choosing commands or keywords that describe the task at hand, and are also 'speech recognition friendly' commands. For example, because of the way ASR systems work, the typical English language speaker will achieve a much greater recognition accuracy in using the subject-verb command 'Window Close' as opposed to the verb preceding the subject format of 'Close Window'.

However even when a set of commands has been highly tuned for optimal recognition rates, there will be users for whom the command set is not usable. For example, some dialects, or users with speech impediments may find certain commands hard to pronounce correctly, and this will lead to an unusable ASR system.

Embodiments of the present invention (e.g., the software system of an HSC 100) enable end-users of the system to override or otherwise replace an ASR command with one that is better suited to the user's patterns of speech. This task may be affected, for example, in some embodiments via a Graphical User Interface (GUI) control panel that lists all (or any subset of) current system ASR commands. Each system command may be selected and replaced with any command as specified by the user. In this way, the HSC system 100 is customized to achieve optimal recognition rates for users.

In some embodiments, the user may provide an alternative rather than a replacement for a current ASR command. For example, referring to the example set forth above, for a current ASR command of 'Window Close,' the user may introduce the command of 'Close Window,' so that speaking either 'Window Close' or 'Close Window' will cause the window to close.

In some embodiments, when a user introduces a substitute or alternative command, the change will be permanent (i.e., will remain in effect until explicitly changed by a user or other maintenance action). In other embodiments, the change may only remain in effect for a predetermined time interval (e.g., for the remainder of the day, week, month, or for an explicit time period such as 60 minutes, 24 hours or 5 days).

In some embodiments, the substitute or alternative command may only be effective for the user who is making the change. In other embodiments, the change may be effective for all users of the system.

Figure 3:
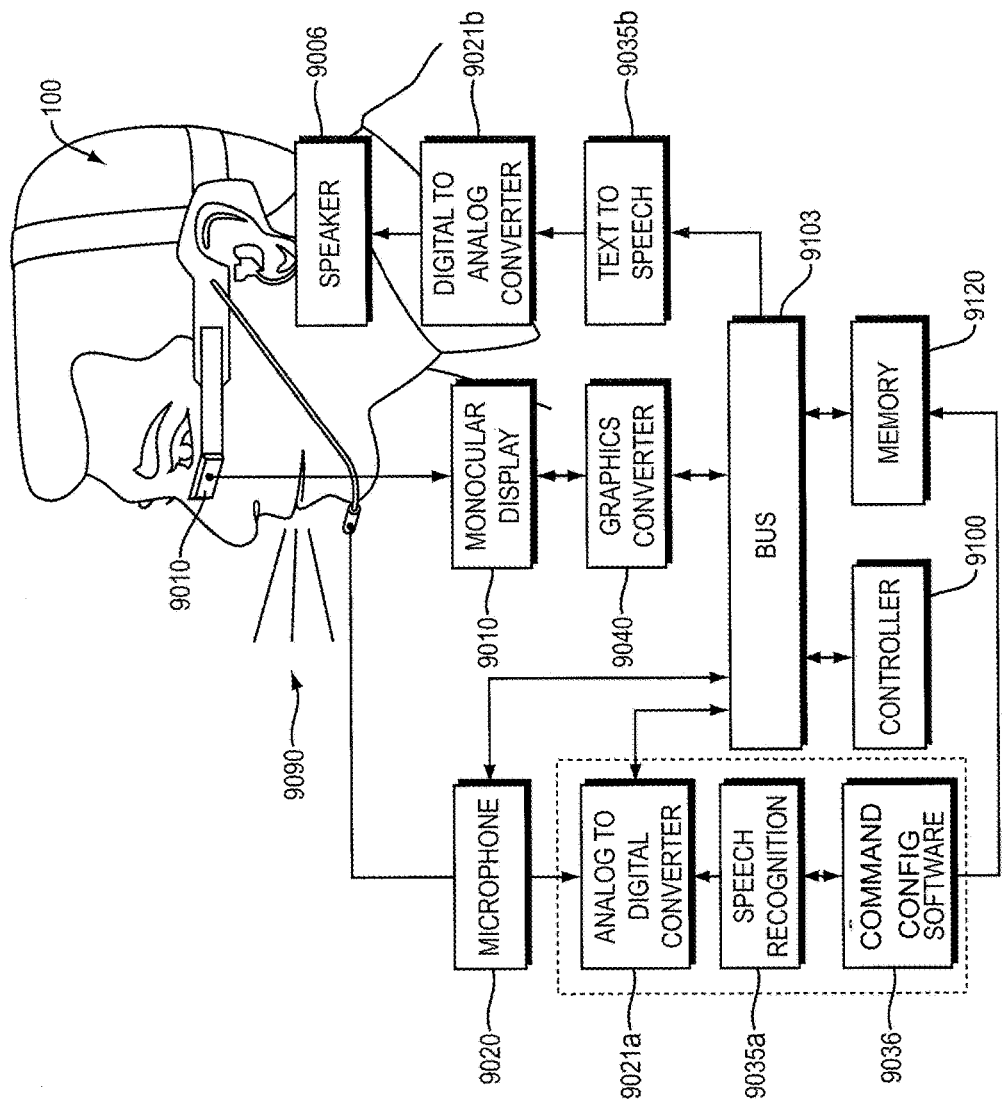
FIG. 3 is a block diagram of ASR (automatic speech recognition) subsystem in embodiments.

FIG. 3 shows an example embodiment of a wireless hands-free video computing headset 100 under voice command, according to one embodiment of the present invention. The user may be presented with an image on the micro-display 9010, for example, as output by host computer 200 application mentioned above. A user of the HMD 100 can employ joint head-tracking and voice command text selection software module 9036, either locally or from a remote host 200, in which the user is presented with a sequence of screen views implementing hands free text selection on the micro-display 9010 and the audio of the same through the speaker 9006 of the headset computer 100. Because the headset computer 100 is also equipped with a microphone 9020, the user can utter voice commands (e.g., to make command selections) as illustrated next with respect to embodiments of the present invention.

FIG. 3 shows a schematic diagram illustrating the modules of the headset computer 100. FIG. 3 includes a schematic diagram of the operative modules of the headset computer 100.

For the case of speech command replacement in speech driven applications, controller 9100 accesses user command configuration module 9036, which can be located locally to each HMD 100 or located remotely at a host 200 (FIGS. 1A-1B).

User configurable speech command or speech command replacement software module 9036 contains instructions to display to a user an image of a pertinent request dialog box or the like. The graphics converter module 9040 converts the image instructions received from the speech command module 9036 via bus 9103 and converts the instructions into graphics to display on the monocular display 9010.

The text-to-speech module 9035b may, contemporaneous with the graphics display described above, convert the instructions from text selection software module 9036 into digital sound representations corresponding to the contents of the screen views 410 to be displayed. The text-to-speech module 9035b feeds the digital sound representations to the digital-to-analog converter 9021b, which in turn feeds speaker 9006 to present the audio output to the user.

Speech command replacement/user reconfiguration software module 9036 can be stored locally at memory 9120 or remotely at a host 200 (FIG. 1A). The user can speak/utter the replacement command selection from the image and the user's speech 9090 is received at microphone 9020. The received speech is then converted from an analog signal into a digital signal at analog-to-digital converter 9021a. Once the speech is converted from an analog to a digital signal speech recognition module 9035a processes the speech into recognized speech.

The recognized speech is compared against known speech (stored in memory 9120) and is used to select and substitute a speech command replacement according to the instructions of module 9036. The module 9036 may perform 2-step confirmation of the substitution (user-selected speech command replacement term). Module 9036 may also cross reference or otherwise associate the user-selected replacement command with the original speech command (i.e., the command being replaced) such that future utterance of the replacement command terms is recognized by speech recognition module 9035a, which may cause an action associated with the original command to be executed.

As mentioned herein, the user-selected command may be either a replacement or an alternative to the existing command. In an embodiment associated with the case of an alternative command, the speech recognition module 9035a may recognize either the original command or the alternative command, and in either case may cause the action associated with the original command to be executed.

Figure 4:
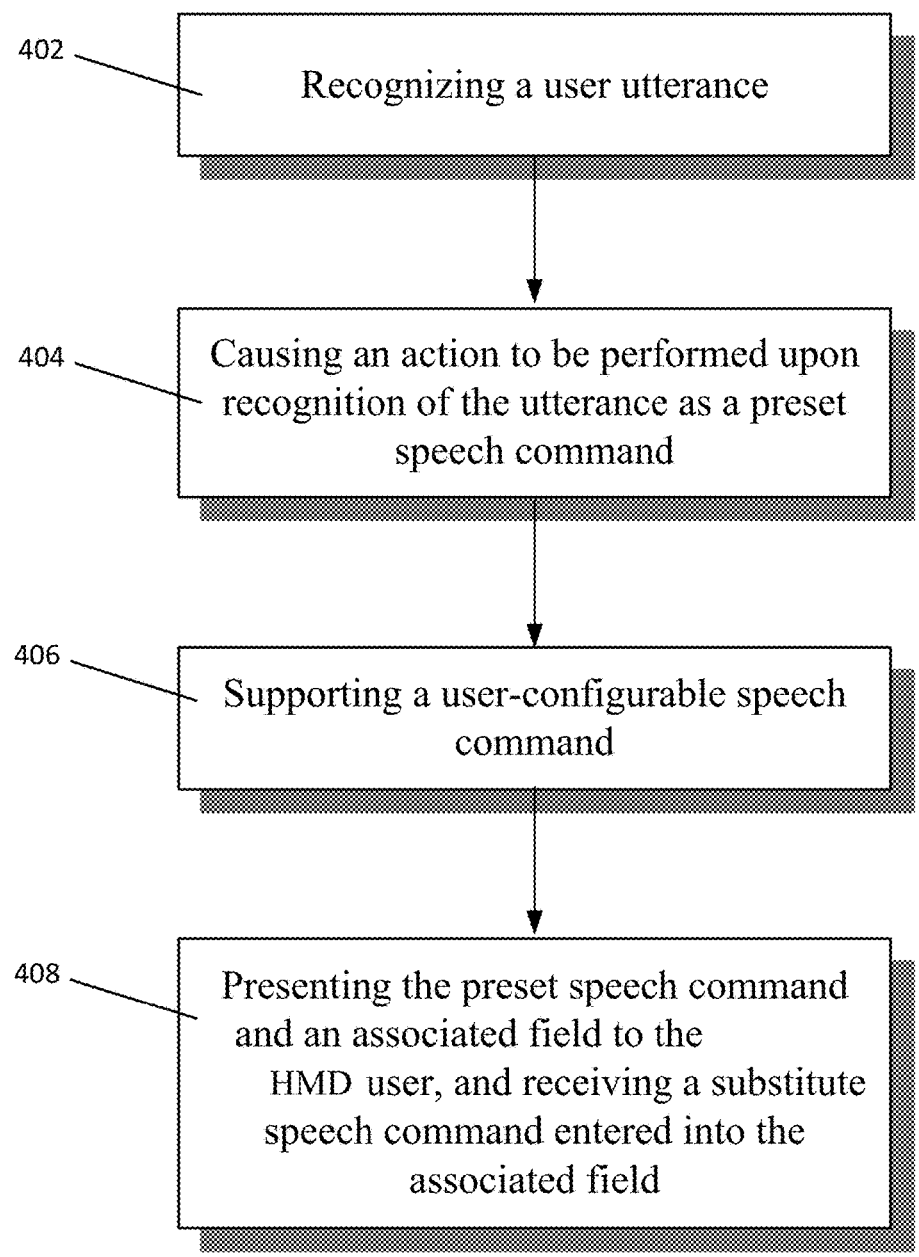
FIG. 4 illustrates one embodiment of a speech recognition method according to the invention.

FIG. 4 illustrates one embodiment of a speech recognition method, which includes recognizing 402 a user utterance, causing 404 an action to be preformed upon recognition of the utterance as a preset speech command, supporting 406 one or more user-configurable speech commands, and presenting 408 the preset speech command and an associated field to the headset computer user, and receiving a substitute speech command entered into the associated field.

It will be apparent that one or more embodiments described herein may be implemented in many different forms of software and hardware. Software code and/or specialized hardware used to implement embodiments described herein is not limiting of the embodiments of the invention described herein. Thus, the operation and behavior of embodiments are described without reference to specific software code and/or specialized hardware—it being understood that one would be able to design software and/or hardware to implement the embodiments based on the description herein.

Further, certain embodiments of the example embodiments described herein may be implemented as logic that performs one or more functions. This logic may be hardware-based, software-based, or a combination of hardware-based and software-based. Some or all of the logic may be stored on one or more tangible, non-transitory, computer-readable storage media and may include computer-executable instructions that may be executed by a controller or processor. The computer-executable instructions may include instructions that implement one or more embodiments of the invention. The tangible, non-transitory, computer-readable storage media may be volatile or non-volatile and may include, for example, flash memories, dynamic memories, removable disks, and non-removable disks.

While this invention has been particularly shown and described with references to example embodiments thereof, it will be understood by those skilled in the art that various changes in form and details may be made therein without departing from the scope of the invention encompassed by the appended claims.

What is claimed is:

1. A computer system comprising:
a head mounted display comprising a microdisplay and a microphone;
a remote host device, comprising:
a processor remotely coupled to the microdisplay and the microphone; and
a speech recognition engine executed by the processor and responsive to user utterances into the microphone, the speech recognition engine configured to (i) cause an action to be performed upon recognition of a preset speech command, (ii) support user-configurable speech commands, and (iii) present the preset speech command and an associated field to a user of the head mounted display, the associated field presented for entry of a substitute speech command.

2. The headset display system computer of claim 1, the speech recognition engine, upon recognizing the substitute speech command, causes a first action to be performed, wherein the first action corresponds to the preset speech command.

3. The headset display system computer of claim 2, wherein the first action is performed only when the speech recognition engine recognizes the substitute speech command.

4. The headset display system computer of claim 2, wherein the first action is performed when either the speech recognition engine recognizes the substitute speech command or when the speech recognition engine recognizes the preset speech command.

5. The headset display system computer of claim 1, wherein the substitute speech command entered in the associated field is valid for a predetermined time interval, after which only the preset speech command is valid.

6. The headset display system computer of claim 1, wherein the substitute speech command entered in the associated field is valid only for the user who submitted the substitute command.

7. The headset display system computer of claim 1, further including a speech command configuration module, operatively coupled to the speech recognition engine, the speech command configuration module enabling an end user to select speech command terms to use in substitution for a given speech command, the user-selected speech command terms forming a substitute command for the given speech command.

8. The headset display system computer of claim 1, further including a speech command configuration module configured to:
   (i) receive a substitute speech command from the user, the substitute command corresponding to the preset speech command;
   (ii) associate the substitute speech command with the action to be performed upon recognition of a preset speech command;
   (iii) perform the action upon recognition of the substitute speech command.

9. The headset display system computer of claim 8, wherein the speech command configuration module is further configured to perform the action upon recognition of the preset speech command.

10. A speech recognition method, comprising:
   in a digital processing device coupled to a head mounted display device and disposed in a location remote from the head mounted display device,
   (i) recognizing a user utterance;
   (ii) causing an action to be performed upon recognition of the utterance as a preset speech command;
   (iii) supporting user-configurable speech commands; and
   (iv) presenting the preset speech command and an associated field to a user of the head mounted display device, and receiving a substitute speech command, from the user of the head mounted display device, entered into the associated field.

11. The method of claim 10, further including, upon recognizing the substitute speech command, causing a first action to be performed, wherein the first action corresponds to the preset speech command.

12. The method of claim 11, further including performing the first action only when the speech recognition engine recognizes the substitute speech command.

13. The method of claim 11, further including performing the first action when either the speech recognition engine recognizes the substitute speech command or when the speech recognition engine recognizes the preset speech command.

14. The method of claim 10, wherein the substitute speech command entered in the associated field is valid for a predetermined time interval, after which only the preset speech command is valid.

15. The method of claim 10, wherein the substitute speech command entered in the associated field is valid only for the user who submitted the substitute command.

16. A non-transitory computer-readable medium with computer code instruction stored thereon, the computer code instructions, when executed by a processor, cause an apparatus to:
   (i) recognize a user utterance;
   (ii) cause an action to be performed upon recognition of the utterance as a preset speech command;
   (iii) support user-configurable speech commands; and
   (iv) present the preset speech command and an associated field to a user of the head mounted display device, and receive a substitute speech command, from the user of the head mounted display device, entered into the associated field.

17. The non-transitory computer-readable medium of claim 16, wherein the computer code instructions, when executed by a processor, further cause the apparatus, upon recognizing the substitute speech command, to perform a first action, wherein the first action corresponds to the preset speech command.

18. The non-transitory computer-readable medium of claim 17, wherein the computer code instructions, when executed by a processor, further cause the apparatus to perform the first action only when the speech recognition engine recognizes the substitute speech command.

19. The non-transitory computer-readable medium of claim 17, wherein the computer code instructions, when executed by a processor, further cause the apparatus to perform the first action when either the speech recognition engine recognizes the substitute speech command or when the speech recognition engine recognizes the preset speech command.

20. The non-transitory computer-readable medium of claim 16, wherein the computer code instructions, when executed by a processor, further cause the apparatus to consider the substitute speech command as valid for a predetermined time interval, after which only the preset speech command is valid.

\* \* \* \* \*